United States Patent [19]

Wallace

[11] 3,933,359

[45] Jan. 20, 1976

[54] VEHICLE LEVELING DEVICE

[76] Inventor: Arthur G. Wallace, 3011 W. 53, Tulsa, Okla. 74103

[22] Filed: Sept. 23, 1074

[21] Appl. No.: 508,062

[52] U.S. Cl. ................. 280/6 H; 267/65 D; 137/45
[51] Int. Cl.² ............................................. B60S 9/10
[58] Field of Search............ 280/6 R, 6 H, 6.1, 6.11; 267/65 R, 65 D; 137/45, 46

[56] References Cited
UNITED STATES PATENTS

| | | | |
|---|---|---|---|
| 2,229,530 | 1/1941 | South | 280/6 H |
| 2,765,866 | 10/1956 | Carroll | 137/45 |
| 2,935,844 | 5/1960 | Parks | 137/46 |
| 3,633,935 | 1/1972 | Boyer | 280/6 H |
| 3,669,409 | 6/1972 | Eranosian | 280/6.1 |

*Primary Examiner*—Philip Goodman
*Assistant Examiner*—John A. Carroll
*Attorney, Agent, or Firm*—Head and Johnson

[57] ABSTRACT

A vehicle leveling system in which the four ends of the axles of a vehicle have air-lift type shock absorbers into which compressed air can be injected or removed. Each of the shock absorbers are connected by tubing to a central chamber which is level with the vehicle floor. Inside of the chamber is a heavy plumb bob which comprises a vertical shaft suspended by a flexible straight wire. The bob is an inverted truncated cone. The supporting wire is sealed through the closed roof of the chamber and can be raised and lowered. Four valves are placed around the circumference of the chamber, 90 degrees apart, with valve stems that project radially inwardly, and are just barely in contact with the circumferential surface of the plumb bob.

10 Claims, 3 Drawing Figures

VEHICLE LEVELING DEVICE

BACKGROUND OF THE INVENTION

This invention lies in the field of vehicle leveling systems. More particularly, it is in the field of pneumatic leveling systems in which compressed air is supplied to one or more leveling cylinders by an automatic gravity controlled valving system.

In the prior art vehicles such as automobile trailers or recreational vehicles, farm and industrial machines as well as other portable equipment requiring leveling have been leveled by manual means operating screw or hydraulic levelers at each of the corners of the vehicle. These require much repetition of raising or lowering until a balanced condition of the cylinders is reached at which time the floor of the vehicle is leveled. There has been a need for an automatic leveling system which, on one operation, controls the flow of compressed air to a plurality of lifting cylinders at each corner of the vehicle, so as to attain a horizontal condition automatically, simply and quickly.

SUMMARY OF THE INVENTION

It is a primary object of this invention to provide a simple automatic means for leveling a vehicle which rests on a non-level surface. It is a further object of this invention to provide a self-leveling system in which gravity provides an operating force on a valving system which, in conjunction with a plurality of leveling cylinders, automatically brings a vehicle surface to a horizontal position.

This and other objects are realized and the limitations of the prior art are overcome in this invention by providing a pressurized cylinder which can be attached to a portion of the vehicle which is parallel to the floor of the vehicle. There are four valves radially attached to the cylinder at 90° in the circumference to each other. Inside of the cylinder is an inverted conical plumb bob suspended by a small wire sealed through the closed top of the chamber, the tapered plumb bob is positioned at a vertical position such that its tapered surface contacts the tips of the stems of the valves, so that when the vehicle is level all of the valves will be closed.

If the floor of the chamber is not level the plumb bob will swing by gravity in the direction of the maximum slope of the base (to the low side) and will contact one, or at most two, of the valves and open the stems, to the point where compressed air will flow from the chamber to the corresponding lift cylinders connected by tubing to those valves. As compressed air is supplied to the cylinders, that corner, or those corners, will be raised until the plumb bob swings to a central position and permits the corresponding valves to close, at which time the floor of the vehicle and the base of the chamber should be level.

The central support wire for the plumb bob is attached to a lever which is commonly in a horizontal position and contains a screw means for raising or lowering the plumb bob so that a proper portion of the surface of the plumb bob will contact the tips of the valve stems. For traveling position, the lever is raised and the plumb bob is pressed tightly against the upper surface of the chamber which stabilizes the plumb bob and prevents it from swinging. At the same time as it is raised, a smaller diameter portion of the plumb bob is in the plane of the valves so that there is considerable clearance between the plumb bob and the valves, avoiding further operation of the valves.

To exhaust the compressed air from the chamber and the leveling cylinders the lever is pushed to a lower position, where all the valves are opened and the chamber is opened to the atmosphere by a separate control valve. This exhausts the chamber to the atmosphere, and also each of the four lift or leveling cylinders.

BRIEF DESCRIPTION OF THE DRAWINGS

These and other objects and advantages of this invention and a better understanding of the principles and details of the invention will be evident from the following description taken in conjunction with the appended drawings in which.

DESCRIPTION OF THE PREFERRED EMBODIMENT

Figure 2:
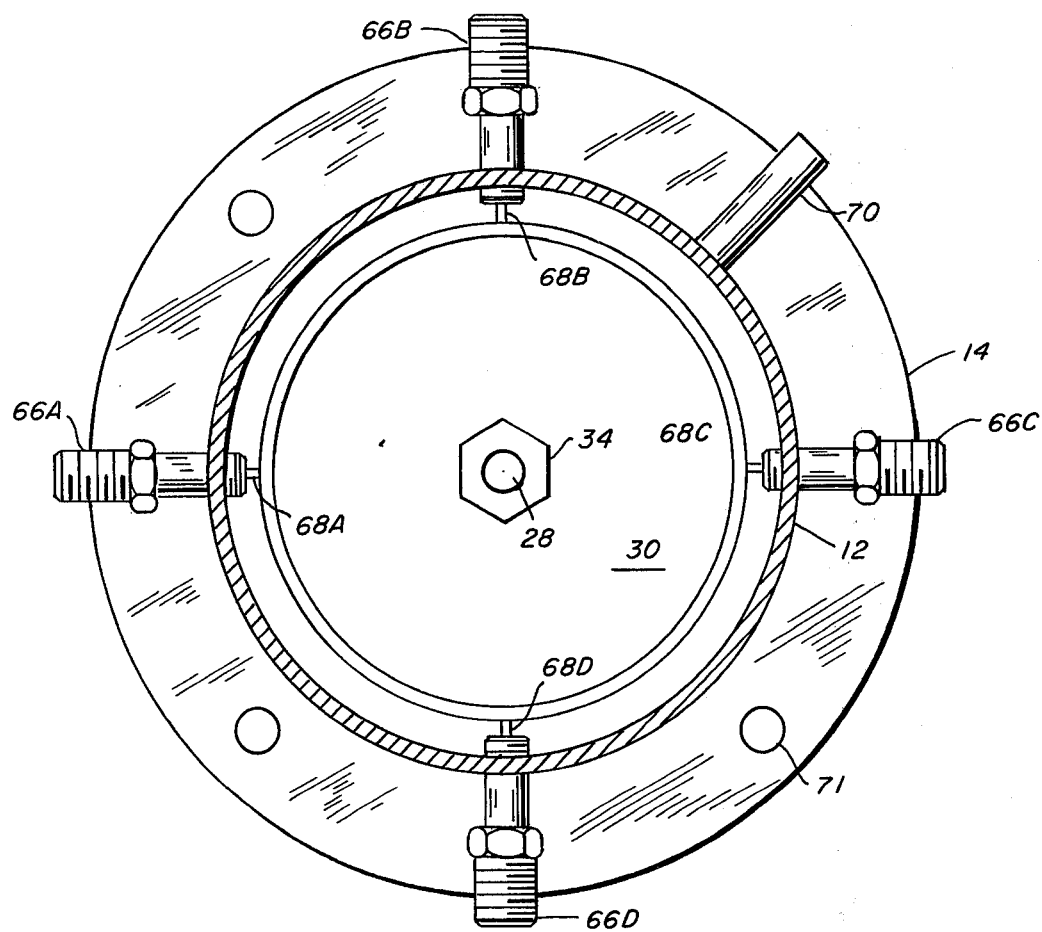
FIG. 2 represents a horizontal cross section of the chamber along the plane 2—2.
Figure 3:
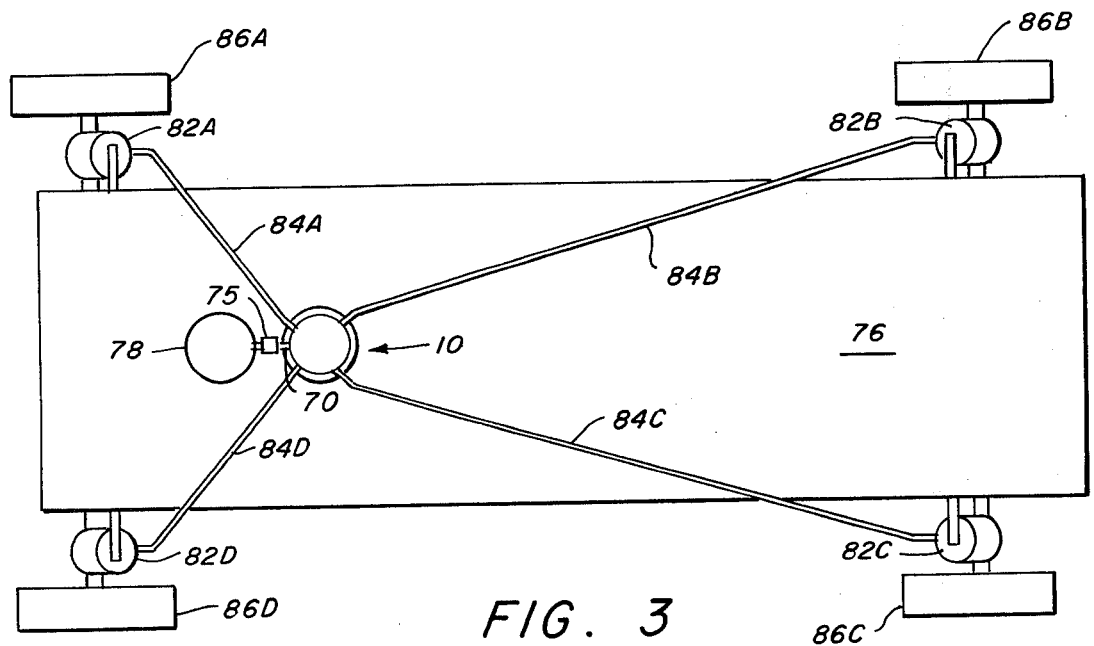
FIG. 3 represents a horizontal view in schematic form of the complete leveling system.

Referring now to the drawings, and in particular FIG. 3 there is shown in schematic form a vehicle 76 having four wheels 86A, 86B, 86C, 86D. There are four lift cylinders, which can be air lift type shock absorbers, positioned between the axles and the frame of the vehicle 76 at each of the wheels. These lift cylinders are numbered 82A, 82B, 82C, 82D. Each of the lift cylinders is connected by a small diameter tubing 84A, 84B, 84C, 84D, respectively, to a control chamber indicated generally by the numeral 10, which is supplied with compressed air from a source 78 through a valve 75 and pipe 70. The control cylinder 10 is shown in greater detail in FIGS. 1 and 2.

Figure 1:
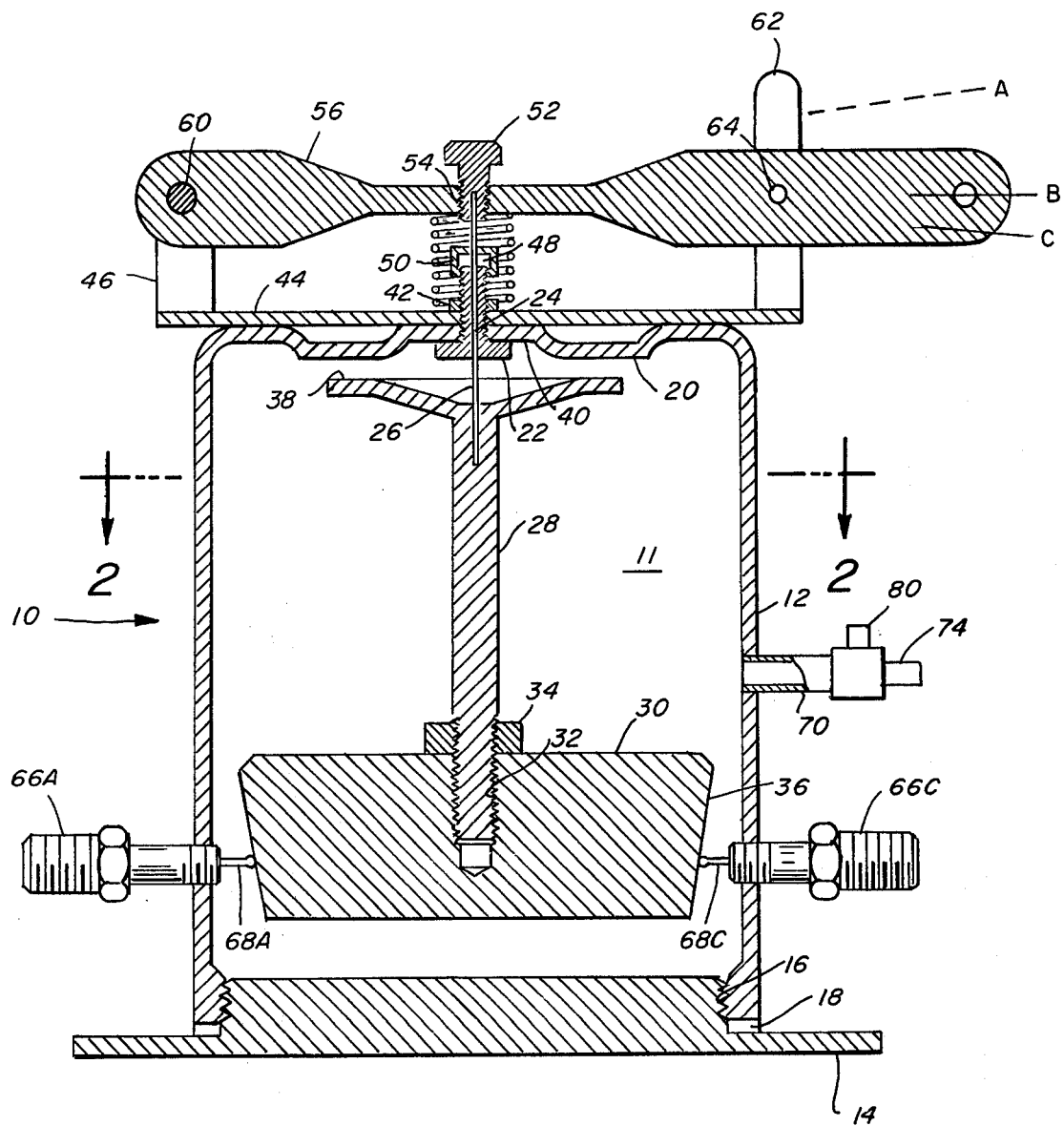
FIG. 1 represents a vertical cross section of the control chamber.

Referring to FIG. 1 there is shown a cylinder 12 attached as by threads 16 to a base plate 14 and sealed by means of a compression sealing means 18. A tubing 70 is sealed through the wall 12 carrying a valve 75 which can accept compressed air through an inlet pipe 74. The compressed air will flow into the cylinder, into the space 11, or conversely when the valve is turned to open the space 11 through the tubing 70 to an exhaust port 80 where the compressed air will exhaust to the atmosphere.

Axially located inside the cylinder is a plumb bob, comprising a central post 28 supporting a heavy plumb bob 30 which is shaped as an inverted truncated cone. The post or rod means 28 is attached to the plumb bob as by threads 32 and lock nut 34. The plumb bob is supported by an axial wire 26 which passes up through an axial hole in a screw 22 which is sealed through the closed end 20 of the chamber 12. A nut 42 holds a horizontal strap 44 tightly to the cylinder. An upright portion 46 of the strap 44 carries a pivot 60 to which a vertically moving lever 56 is pivoted.

The support wire 26 is sealed through a central opening 24 in the screw 22 and a sealing packing gland 50. The wire extends further and is supported in a screw 52 which is threaded into the lever 56 by means of threads 54. Thus, the plumb bob can be raised or lowered within the cylinder by operation of the screw 52. It can also be raised and lowered by means of the lever 56 to one of three possible positions indicated generally as A, B, and C. At an appropriate level in the cylinder 12 are positioned four valves numbered 66A, 66B, 66C, 66D.

Each of these are of the type which have a valve stem numbered 68A, 68B, 68C, 68D, respectively. These valve stems are in possible contact position with the plumb bob. When the floor of the vehicle and the under surface of the plate 14 is horizontal and the lever 56 is in the position B, the plumb bob will hang vertically from the wire 26, and will be centrally positioned inside the cylinder 12. Its circumferential surface 36 will then just barely contact the valve stems 68 and they will all remain closed.

If the plate 14 is tilted out of the horizontal, then the pendulum will swing in the direction of the greatest slope and will exert a side pressure on one or two of the valves, pushing their stems inwardly to the point where the valves are partially opened. If the inner space 11 of the chamber has previously been pressurized with compressed air through valve 75, this compressed air will then flow through the one or two valves, to the appropriate lift cylinders connected to these valves. Consequently, that corner or corners of the vehicle connected to that valve or valves will be raised. As they are raised, the floor of the cylinder will be moved into a horizontal position, and the plumb bob will them move back to its center position, releasing the valve stems and closing the valves.

Once the valves have been operated to pressurize one or more of the cylinders so as to level the vehicle, the lever 56 is raised to the position A. Here the plumb bob is at a position where it is above the level of the valves and can no longer contact the valve stems. Preferably as shown in FIG. 1, a flange surface 38 can be attached to the central axial rod 28 so that by lifting the lever 56 to the position A the flange 38 will seat against the surface 20 of the case, and will hold the plumb bob in a rigid axial position, so that there will be no chance of further contact of the plumb bob and the valve stems.

When it is desired to prepare the vehicle for travel condition the compressed air in the lift cylinders and in the chamber must be discharged. This is accomplished by opening the valves 75, discharging the compressed air in the space 11 of the chamber to the atmosphere. Then the lever 56 is moved down to the position C. Because of the increased diameter of the plumb bob all valves are opened, permitting the compressed air in each of the lift cylinders to be discharged through the valves into the space 11 and out through the valves 75 to atmosphere. After the cylinders are discharged, the lever is moved to the upper position A where it is locked in position by meams 64. In this position the plumb bob is rigidly clamped and vibration due to the movement of the vehicle cannot cause relative movement of the plumb bob.

Important features of this invention are the single axially supported plumb bob weighted so as to be able to exert considerable pressure on the valve stems and to operate those which are in the direction of the lowest portion of the vehicle surface. Further, the tapered downwardly shape of the plumb bob is important so that vertical adjustment of the position of the plumb bob by screw 52 will permit fine adjustment of the valves. Further important features are the clamping flange 38 which becomes effective as the lever 56 is lifted to position A so as to rigidly clamp the position of the plumb bob, and finally the remaining feature of lowering the lever 56 so that the plumb bob can be dropped to a point where its larger diameter will open all valves simultaneously and cause the air to be discharged from the lift cylinders.

Of course, in a vehicle having three wheels, only three lift cylinders will be required and three valves in the control chamber. These valves would preferably be in a 120° spaced relation.

While the invention has been described in terms of a vehicle with wheels etc, it could also be applied to a structure supported by at least three points of support, with lift cylinders in each point of support, the structure standing on a surface that changes angle with the horizontal, such as a floating object, and so on.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. A vehicle leveling system comprising
   a. a vehicle having a frame to be maintained in a horizontal position, said frame having at least three spaced points of support;
   b. pressure fluid lift cylinder means in each of said points of support, said lift cylinder means connected by conduit to a pressure fluid control chamber;
   c. said pressure fluid control chamber comprising a cylinder having a base attached to said frame to be coplanar therewith;
   d. a plumb bob axially supported in said chamber by a flexible wire, said plumb bob in the shape of an inverted truncated cone;
   e. a plurality of at least three valves mounted circumferentially spaced in the wall of said chamber at a selected horizontal plane relative to said plumb bob, and valve stems projecting inwardly from each valve to the surface of said plumb bob when said base is horizontal, said valves connected by said conduits to said lift cylinders; and
   f. means to provide pressure fluid to the interior of said control chamber.

2. The system as in claim 1 in which said points of support comprise wheels turning on axles.

3. The system as in claim 2 including four wheels and four lift cylinders, and four valves spaced at 90 degrees around said chamber.

4. The system as in claim 1 including means to support said plumb bob out of contact with said valve stems.

5. The system as in claim 4 including means to lift said plumb bob above said valve stems.

6. The system as in claim 4 including means to stabilize said plumb bob to limit its horizontal movement.

7. The system as in claim 1 including means to lower said plumb bob whereby a larger diameter portion of said plumb bob contacts all valve stems to open all valves.

8. The system as in claim 1 including means to exhaust the interior of said chamber to the atmosphere.

9. The system as in claim 1 in which each of said valves is connected to that one of said lift means which is positioned with respect to said frame generally at about the same angle as said each valve is positioned with respect to said frame.

10. The system as in claim 1 including means to raise and lower said plumb bob.

* * * * *